April 23, 1963     W. H. KEETON     3,086,802
KNOT TYING DEVICE
Filed Nov. 30, 1961
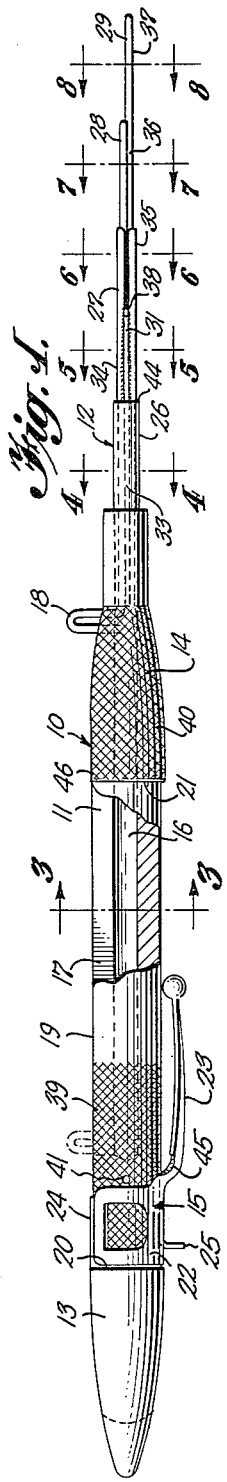
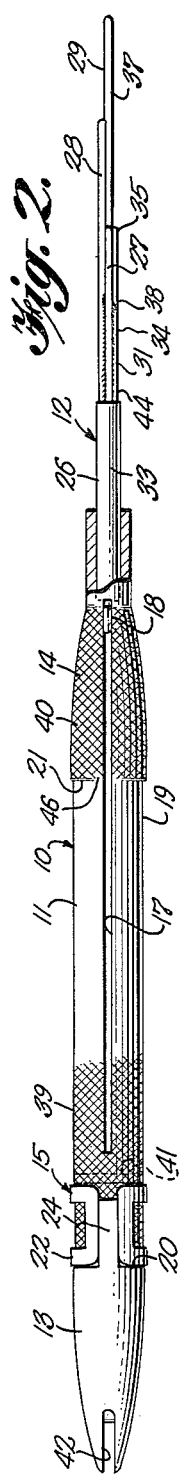
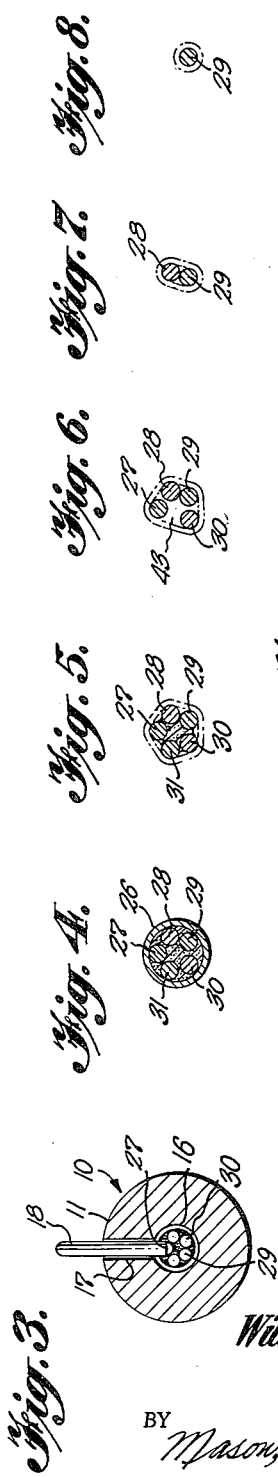
INVENTOR
*William Hollis Keeton*
BY *Mason, Fenwick & Lawrence*
ATTORNEYS

United States Patent Office 3,086,802
Patented Apr. 23, 1963

3,086,802
KNOT TYING DEVICE
William H. Keeton, 321 E. Beauregard Ave.,
San Angelo, Tex.
Filed Nov. 30, 1961, Ser. No. 156,005
17 Claims. (Cl. 289—17)

This invention relates to a fisherman's knot tying device and has for its general object the provision of a small portable implement that can be carried on the clothing of the fisherman or in his kit, having the capability of tying and tightening the various knots that may be required in the art of fishing, whether the material employed be braided, twisted or monofilament lines, or leader materials.

Another object of the invention is to provide a device of the character described, in which the knot after being tied is subjected to discrete steps of tightening, whereby the knot is contracted in orderly manner without displacement of its wraps or convolutions, so that no peak of strain is concentrated at any point in the convolutions of the knot, but on the contrary, the stress of tightening is distributed throughout the length of the material involved in the knot without the development of weakness, enabling the final tightening of the knot to be carried almost to the rated point of breaking of the line or leader material.

Still another object of the invention is the provision of a knot tying device of the type described, employing a stepped mandrel each of the sections of which is of uniform cross-sectional size and shape throughout its length, the relative cross-sectional size and shape of successive sections being such as to determine successively smaller circumferences in a flexible strand successively tensioned about said sections in encircling contiguity therewith, a mandrel so constructed permitting the knot to be wrapped and tied and partially tightened on a larger section, then slipped to an adjacent smaller section and further tightened, then if necessary, slipped to a still smaller section and further tightened.

Other objects of the invention will appear as the following description of a practical embodiment thereof proceeds.

In the drawing throughout the several figures of which the same reference characters have been employed to denote identical parts:

FIGURE 1 is an enlarged side elevational view of the invention with certain parts being broken away;

FIGURE 2 is a plan view of the device with parts also shown broken away;

FIGURE 3 is a transverse section view taken along line 3—3 of FIGURE 1;

FIGURES 4, 5, 6, 7 and 8 are enlarged transverse sectional views, respectively, taken through the mandrel portion of the device as indicated in FIGURE 1;

FIGURE 9 is a greatly enlarged detail view showing a particular utilization of the tip end of the mandrel;

FIGURE 10 is a greatly enlarged longitudinal sectional view through a portion of the mandrel with a typical knot being tied thereon, and FIGURE 11 is a diagrammatic view of a typical fisherman's knot.

Proceeding now to a description in detail of the drawings, the knot tying device as a whole is designated by the numeral 10, comprising fundamentally a body 11 and a stepped mandrel 12 upon which the knot is formed, tied and tightened. The body has the general shape of a mechanical pencil or fountain pen, being elongated, in general round in cross-section and having tapered end portions 13 and 14 and being provided with the spring clip 15 for retaining it in the pocket, said clip having other functions, which will appear in due course. The body is formed with an axial bore 16 opening in its forward end and extending depthwise a sufficient distance within the body to allow the complete retraction of the mandrel thereinto. The body has a longitudinal slot 17 extending from the inner end of the bore 16 parallel thereto and terminating a short distance from the forward end of the body, communicating with the bore throughout the length of the slot. The mandrel has an operating handle 18 at its inner end which projects through the slot and frictionally engages the sides of said slot so that effort is required to extend or retract the mandrel and it will not move in or out of its own accord.

The intermediate part of the body is of slightly smaller diameter than end portions, forming a slideway 19 for the clip 15, which frictionally grips the slideway. Shoulders 20 and 21 formed between the intermediate part of the body and the end portions 13 and 14, form stops to limit the range of sliding movement of the clip. In common with most detachable pencil clips, the clip 15 comprises a resilient split collar 22 at its upper end, the sides of which do not quite come together, and a resilient tongue 23 extending downward from said collar at a point diametrically opposite the split in said collar, the tongue having a ball end. In the present instance the collar grips the slideway 19 with sufficient pressure to give it considerable resistance to being moved. A short rib 24, which is in line with the slot 17, but spaced therefrom, extends longitudinally from the shoulder 20, which when the clip is contiguous to this shoulder and suitably orientated, interdigitates with the space which forms the split in the collar 22, preventing rotation of the clip. In all positions of the clip forward of the rib 24, the clip is capable of being rotated about the body as well as being slidable longitudinally thereupon. The collar 22 is formed with a small stamped out extension 25, in longitudinal alinement with the tongue 23, for a special use to be explained, and the sides of the tongue adjacent its juncture with the collar are sharpened, forming cutting edges 45.

Referring now to the mandrel 12, it is built up of a bundle of stiff resilient wires soldered into a tubular socket 26, the socket having a sliding fit within the bore 16. The stepped sectional shape of the mandrel is obtained by terminating one or more of the wires at each point in the length of the mandrel at which reduction in cross-sectional area is desired. It is conceivable that the mandrel could be made of a monolithic rod, with the reduced sections obtained by machining, but the wire construction has been selected as the illustrative embodiment, since it has certain advantages and is probably less costly.

FIGURE 4 shows the position of the wires within the socket tube. Five wires are shown, 27, 28, 29, 30 and 31. They are arranged in the socket tube in a circumferential series, tangent to one another and tangent to the inner wall of the socket tube. Each is the same radial distance from the axis of the socket tube. The wires are soldered to the socket tube and to one another within the socket tube, and keep their radial distance and position of circumferential displacement throughout the extent of their lengths, with the exception of wire 27, which extends rearwardly from the socket tube into the bore 16 and is formed with a laterally deflected open-looped end, constituting the handle 18, extending through the slot 17, the free side of the loop pressing resiliently against the side of the slot to prevent free movement of the mandrel. The position of the wires with respect to the axis of the mandrel is shown in the series of FIGURES 4 to 8, each of which figures indicates a point in said axis.

The socket tube itself constitutes the first section 33 of the mandrel. The thickness of the annular wall of the socket tube defines a shoulder between said section and the adjacent section 34. It is to be noted in FIGURES 1, 6, 7 and 8 that the wire 31 is the shortest, terminating in a chamfered end 38, which slopes forwardly toward the axis of the mandrel. The length of this wire beyond the end of the socket tube defines the length of section 34. The knot may be wrapped on sections 33 or 34 according to the material of the line or leader in which the knot is being formed. Wires 27 and 30 terminate in the same cross-sectional plane, defining the end of the third section 35. The wire 28 terminates at a distance forward of the end of section 35, defining the end of the fourth section 36, while the wire 29 continues singly beyond the end of section 36, terminating at the end of the mandrel and constituting the final section 37. Incidentally, only one wire need to have terminated at the end of section 35, but from the practical standpoint the arrangement shown is adequate and avoids adding an unnecessary section to the mandrel.

The body 11 of the knot typing device is provided with circumferential knurled areas 39 and 40, extending forwardly from the shoulders 20 and 21, and with a hole 41 extending transversely therethrough at a point between the inner end of the bore 16 and the plane of the shoulder 20, and normally covered by the collar portion of the clip. The knurled area 40 facilitates holding the knot tying device while wrapping and tying knots. The knurled area 39 provides a grip for the knot tying device when the hole 41 is being used in tightening the knots, as will appear. The tapered end 13 of the body terminates in a longitudinally bifurcated portion forming a slot 42, useful when sizing and tying snells, and which may also be employed for disgorging fishhooks. The covering of both ends of the hole 41 by the collar of the clip 15, when in normal position, keeps the hole clear of trash particles and fish debris, so that it maintains free passage for the threading through of the line or leader material.

The basic fisherman's knot is made by holding a length of the line and making a series of wraps about the line (usually 4 to 7) extending successively backward over the line. The end which is used in making the wraps is then thrust through the coil of wraps, issuing from the end opposite the held portion. The portions of line extending from both ends of the coil are then pulled to tighten the knot. If the knot is being wrapped solely by hand, that is, without mechanical aid, care must be taken that the wraps are of the same diameter and held coaxially. When the opposite portions are pulled, tightening involves the twisting of the coil, resulting in reduction of the diameter of the wraps. It is extremely difficult to effect the uniform reduction of the wraps, due to the fact that the twist is communicated from the ends toward the center of the coil, and the frictional contact between adjacent wraps may not be uniform; also the reduction in diameter when carried out in a single step is extensive, resulting in the wrap changing size in a desultory manner, causing some wraps to override others in a disorderly entanglement. This results in sharp bends, and concentration of the stress of tightening at localized points, whereby areas of weakness are developed. By the present invention the wraps are laid circumferentially upon a section of uniform cross-section about which they approximately fit and cannot at this stage move out of mutual coaxial relationship. Then they are slidably moved to an adjacent section of slightly smaller uniform cross-section, tied, and tightened down to a snug sliding fit on this section, then slidably moved to the next reduced section, and so on. Thus, the tightening process is divided into a plurality of discrete steps, in each of which the coil of wrap is brought to a close fit about a mandrel section so sized with respect to the preceding section as to practically eliminate the chance of entanglement of the wraps, and in which the tightening stress is applied in stages to an orderly arranged coil, permitting the stress to be uniformly distributed through the wraps at each stage, producing uniform twisting of the coil and avoiding the weakening of the knot by abrupt bending of any of the wraps and concentration of a peak stress in any part of the knot.

In the operation of the knot tying device of the present invention, the body 11 is held in the hand with the parts positioned as shown in FIGURE 1, the mandrel 12 being fully extended, the forward part of the body being gripped at the knurled area 40 between the little finger and one next to it at one side and the thumb on the other, in such manner as to press the opposite end portion of the body against the heel of the hand, so that the device is firmly held, leaving the middle finger free, enabling the user to place the tip of this finger and the finger nail against the mandrel substantially perpendicular thereto at various points in its length.

Knots tied in most commonly used sizes of line and leader materials can be wrapped on section 34, so the description of operation will start at this section. The line (this term including leader material) is tightly held between the thumb and body of the device, leaving enough length in the direction of the mandrel and parallel thereto, to be taken up in the wrap and leave a tying and tightening tip. It is recommended that most knots be given from four to seven wraps, fewer wraps being used with braided or twisted lines than with monofilament or leader material, since the roughness of the surface of the former makes it more difficult for the wraps to move in a diametrical plane against one another in the act of tightening, than in the case of the slicker monofilament line or leader material.

The middle finger is held with the nail pressed against section 34. The wrapping of the knot is begun by holding the free end of the line or leader material in the free hand, and the first wrap is started tensioning the free end and bringing the line or leader material crosswise of the mandrel into contact with the tip of the middle fingernail and the section. The line is then wrapped around the section. Upon completion of the first wrap, the second wrap is wrapped so as to over wrap the line toward the fingernail. In placing this wrap, the line may be brought down against the nail and guided thereby into position against the section between the first wrap and the nail. If necessary, the finger tip may be shifted slightly away from the first wrap to let the second wrap move into position. Each succeeding wrap is applied parallel to and in contact with the preceding wrap until the desired number of wraps have been made. Sufficient tension must be exerted on the line while wrapping and forming the knot to snugly but slidably wrap the line on the section 34. All of the wraps at this stage are of the same diameter and coaxial.

The finger tip is now shifted to a position over the coil formed by the wraps, and pressed against said coil to hold the wraps in place while the coil is shifted by movement of the finger tip to the adjacent section 35, which is of reduced cross-sectional area, the line being released from beneath the thumb to allow the coil of wrap to be thus shifted. It will be noted from FIGURES 1 to 8, inclusive, that the wire 29 is the only one that extends throughout the length of the mandrel and that it is part of the section 34, and maintains the same radial distance from the axis of the mandrel and the same position of circumferential displacement throughout, so that its outer side is level with the surface of the section 34 and the other sections of smaller cross-sectional area than section 34, so that it forms an ideal track along which to slidably shift the knot from one section to another in the operation of tying and tightening, being free from deviations of any sort, which if present might throw the wraps out of coaxial relationship while being transferred from one section to another. The wire 29 may be brought to a position under the tip of the middle finger by axially rotating the device while holding the coil of wraps against section 34, the section turning within the coil.

The termination of the shortest wire 31 at the beginning of section 35 creates a longitudinal channel 43 through section 35. With the coil of wraps held pressed against section 35, the free hand is used to introduce the tip end of the line through said channel, the chamfered end of wire 31 serving as a guide to the mouth of said channel. Thus, the knot is tied, the line extending from both ends of the coil. The extending portions are now oppositely pulled, tensioning the coil and causing a twisting movement between the wraps that reduces the diameter of the coil until it slidably fits the section 35.

The knot, pressed by the end of the finger, is now transferred to the section 36, as described, further tightened, and similarly transferred to the final section 37, being still further tightened to the point of being a snug sliding fit on this section. The tying device is now withdrawn from the knot. At this point the clip 15 is moved so as to expose the hole 41; the tying tip of the line is inserted in the hole and pulled through a sufficient distance to enable it to be folded down against the body in the knurled area 39 and held with the thumb while the body is tightly overwrapped with two or three turns of that portion of the line on the opposite side of the knot from the tying tip, the object being to anchor the tying tip to the body of the tying device. With one hand grasping the tying device at right angles to the tying tip, and the other hand holding said opposite portion, both parts of the line are oppositely pulled with great stress, close to the rated breaking point of the line, to effect the final tightening of the knot. It is a basic requirement, for the best results, that all knots made on this device be tightened to nearly the maximum tensile strength capabilities of the materials in which the knots are being tied.

The wrapping of knots, in certain materials may be done on section 33. Since this section includes the socket tube 26, there will be an annular shoulder 44 at the end of the section from which the coil, pressed by the finger tip, must fall when being transferred to the section 34. Care must be taken that the finger pressure be such that wraps do not override one another when making this descent. When the coil is pressed against section 34, the side of the coil opposite the side pressed, will be spaced from the surface of the section a distance equal to twice the thickness of the wall of the socket tube, affording ample room for the insertion and passage of the tying tip between the wraps and the surface of the section.

The knot herein described is the basic knot and figures in practically all knot tying expedients practiced by fisherman. Only such expedients will be touched upon in this description as illustrate the utility of the specific structural features of the knot tying device.

In making snells for fishhooks, an appropriate length of the snell material is cut and a loop formed by folding down five or six inches of material. This loop is placed over and against the extension 25 and both limbs of the loop are held between the thumb and knurled area 40, and both are wrapped together about the selected section of the mandrel. It will be found that in wrapping the knot, the two strands twist. Therefore, after two wraps, the strands are held down by the middle finger and the twist removed so that the wraps lie side by side. This is repeated for the next two wraps. Usually four wraps are used for this variation of the basic knot. Both strands are inserted through the coil formed by the wraps, and pulled to give the first step of tightening to the knot. The loop is then removed from the extension 25 and the knot transferred from one section to a smaller, and subjected to the stage tightening as previously described. One strand may be trimmed off close to the knot, by pressing it against one of the knife edges 45. The other is continued to make up the desired length of the snell, including enough additional length to make the knot at the fishhook. Longer loops may be made in the snell material by hanging the folded strands over the end of the body 11 in the slot 42. Still longer snell loops may be made by placing the folded strands, first about the extension 25 and then passing them through the slot 42. Additional length may be sized by sliding the clip 15 away from the slot 42 before placing the loop strands about the extension 25. The hook knot is formed subsequent to the completion of the snell loop. By inserting the loop in the slot 42 or hanging it about the extension 25 or placing it about said extension and then passing it through said slot, and bringing the snell under some small tension parallel to the body down to the selected mandrel section for wrapping the hook knot, it is possible to snell any quantity of fishhooks with the same desired length of snell.

It will be noted in FIGURE 1 that the shoulder 21 is non-existent in the region of the path of movement of the mandrel handle 18. This is due to the provision of the flattened area 46, the object of which is to prevent the fingernail from catching on the shoulder when the handle is being operated to extend the mandrel. The clip 15 is in its limit position against the shoulder 20 when the cutting edges are to be used, the rib 24, through its interdigitation with the split collar immobilizing the clip against rotary movement incident to lateral pressure against the cutting edges.

The body of the knot tying device may be made of plastic or noncorrosive metal, the wires constituting the mandrel being preferably of spring steel. The ends of the wires 27, 28 and 30 are slightly rounded to avoid burs or edges that might abrade the knot material as the knot is slipped over them. The end of the terminal wire 29 is preferably oval pointed to facilitate, as seen in FIG. 9 for example, inserting the wire into and through the center of the end of braided fly line 50, between the braids and forcing it out through the side of the line, an expedient employed in splicing braided line to other material. The terminal end of wire 29 is also used for unscrambling entanglements in lines, particularly in pulling out loops from the difficultly accessible tangled maze on the reel spool, such as results from back lash.

While I have in the above description disclosed a practical embodiment of my knot tying device, it is to be understood that the construction and arrangement of parts, as shown, are by way of example and not to be construed as limiting the comprehensiveness of the invention.

What I claim is:
1. Knot tying device including a mandrel shaped to form a longitudinal series of sections, each of which is substantially uniform in cross-sectional area and shape throughout its length, and smaller in cross-sectional area than the one preceding it in diminishing sequence toward the free end of said mandrel, the section at the larger end of said series being symmetrical with respect to its axis and the surfaces of all sections coinciding at one side with a line of uninterrupted rectilinearity parallel to said axis, the shape and size of said cross-sectional areas of successive sections being such as to determine a succesively smaller circumference in a flexible strand applied successively to said sections in tensioned encircling contiguity.

2. Knot tying device including a mandrel consisting of a bundle of closely arranged, stiff, resilient, rectilinear, parallel wires secured together at one end of said bundle, certain wires of said bundle terminating at different points in the length of said mandrel thereby defining a series of sections characterized by the progressive reduction in the number of wires that constitute a section, the relative cross-sectional shape and size of said sections being such as to determine a successively smaller circumference in a flexible strand when it is applied successively to said sections in tensioned, encircling contiguity therewith.

3. Knot tying device including a mandrel consisting of a bundle of closely arranged stiff, resilient, rectilinear, parallel wires secured together, a socket tube fixedly embracing said bundle at one end, certain wires of said bundle terminating at different points in the length of said mandrel beyond said socket tube thereby defining a series of sections characterized by the progressive reduction in the number of wires that constitute a section, the terminal section being a single wire, the relative cross-sectional shape and size of said sections being such as to determine a successively smaller circumference in a flexible strand when it is applied successively to said sections in tensioned, encircling contiguity therewith.

4. Knot tying device including a mandrel consisting of a bundle of closely arranged stiff, resilient, rectilinear, parallel wires secured together, a socket tube fixedly embracing said bundle at one end, certain wires of said bundle terminating at different points in the length of said mandrel beyond said socket tube thereby defining a series of sections characterized by the progressive reductive in the number of wires that constitute a section, the relative cross-sectional shape of adjacent sections being such as to permit a coil of fishing line, wrapped on a section that embodies the larger number of wires and tightened to a uniform diameter determined by said section, may upon being slidably transferred to the adjacent section be reduced by tightening, to a uniform smaller diameter determined by the size of said adjacent section, the channel created in the smaller section by the termination of the correspondingly positioned wire at the point of juncture of said sections forming a passage through which to pass the tying end of the fishing line, for tying the knot.

5. Knot tying device as claimed in claim 4, the terminal section being a single wire.

6. Knot tying device as claimed in claim 4, including an elongated body having a longitudinal bore therethrough opening at one end of said body for receiving and housing said mandrel, the latter slidably fitting said bore and being retractable thereinto.

7. Knot tying device as claimed in claim 4, including an elongated body having a longitudinal bore therein opening at one end of said body, said mandrel slidably fitting said bore and being retractable thereinto, said body having a longitudinal slot opening through the side of said body to said bore for the length of said slot, and means for retracting and projecting said mandrel movable therewith and extending through said slot, frictionally engaging a wall of said slot.

8. Knot tying device as claimed in claim 4, including an elongated body having a longitudinal bore therein opening at one end of said body for receiving and housing said mandrel, said socket tube slidably fitting said bore, said body having a longitudinal slot opening through a side of said body to said bore, one of the wires of said bundle extending rearwardly from said socket tube into said bore having a deflected portion traversing said slot, constituting an operating handle for moving said mandrel, and being formed to frictionally engage the sides of said slot.

9. Knot tying device comprising a body formed with a longitudinal bore opening at one end of said body and a mandrel housed in said bore and projectable therefrom, formed of sections each of uniform cross-sectional area and shape throughout its length, said sections being successively stepped down to smaller cross-sectional dimensions and each section having a longitudinal line in its surface coinciding with a rectilinear line longitudinally geometrically produced from the surface of the section having the largest cross-sectional dimensions, means for slidably projecting said mandrel axially of said bore, said body being formed externally with a slideway between shoulders adjacent the upper and lower ends of said body, a spring clip mounted on said body having a split collar slidably embracing and gripping said slideway limited in its range of reciprocable movement by said shoulders, the ends of said collar where split being spaced, said body being formed with a short rib adjacent the upper shoulder adapted to interdigitate with the collar in the space between its ends when the clip is at the upper end of the slideway to prevent rotation of the clip, said collar having an outward projection serving as a hook adjustable with said clip over which to engage an overfolded piece of line or leader material, as an assist in sizing the length of, and knotting the loop, in making snells.

10. Knot tying device as claimed in claim 9, said body being formed with a transverse hole therethrough of small bore positioned to be covered at both ends by the collar of said clip when the latter is against the upper shoulder, and thereby protected from becoming stopped up by trash or fish debris, said hole being designed for the passage therethrough of the fishing line at one side of the knot when snubbing the line about the body, to use the latter as a hand hold in tightening the knot.

11. Knot tying device as claimed in claim 9, said body having a bifurcated end opposite said mandrel forming a transverse slot, usable as a fishhook disgorger and, independently or in conjunction with the projection on said collar, as a hook over which to hang the looped portion of the line or leader material in sizing the length of, and knotting the loop, in making snells.

12. Knot tying device as claimed in claim 9, said clip having a tongue extending from said collar toward the mandrel end of said body, the sides of said tongue adjacent its point of juncture with said collar having cutting edges, effectively usable for cutting line or leader material slipped beneath said clip, when the latter is immobilized against rotation by the interdigitation of said rib with said collar.

13. Knot tying device including a mandrel shaped to form a longitudinal series of sections, each section being of uniform cross-sectional shape and size throughout its length, successive sections being so shaped and sized that a flexible strand tightened circumferentially successively about each will be progressively reduced in circumference.

14. Knot tying device as claimed in claim 13, said device comprising a hollow body, said mandrel being retractably mounted within said body, and means for projecting and retracting said mandrel.

15. Knot tying device as claimed in claim 13, each section having in its peripheral contour a longitudinal line in coincidence with a rectilinear line longitudinally geometrically produced from the surface of the section that conforms the largest strand circumference.

16. Knot tying device including a mandrel shaped to form a longitudinal series of rectilinearly disposed sections, each section being of uniform cross-sectional shape and size throughout its length, said sections being peripherally contoured to form longitudinal, alternating ridges and valleys, and being so shaped and sized that a flexible strand tightened circumferentially, successively about each will be progressively reduced in circumference.

17. Knot tying device as claimed in claim 16, each section having in its peripheral contour a longitudinal line in one of the ridges coinciding with a rectangular line longitudinally geometrically produced from the surface of the section that conforms the largest strand circumference.

References Cited in the file of this patent
UNITED STATES PATENTS

| | | |
|---|---|---|
| 1,514,010 | Peck | Nov. 4, 1924 |
| 2,550,399 | Blake | Apr. 24, 1951 |
| 2,601,605 | Fulvio | June 24, 1952 |
| 2,859,994 | Whitlinger | Nov. 11, 1958 |
| 2,926,036 | Wimberley | Feb. 23, 1960 |